(12) United States Patent
Hayes et al.

(10) Patent No.: US 9,311,551 B2
(45) Date of Patent: Apr. 12, 2016

(54) SYSTEM AND METHOD FOR SITUATIONAL AWARENESS AND TARGET CUEING

(75) Inventors: Hilary L. Hayes, Waltham, MA (US); John H. Koltookian, Medford, MA (US); Derek T. Robison, Waltham, MA (US); Erik Rencs, Carlisle, MA (US); Michael S. Chan, Medford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 674 days.

(21) Appl. No.: 13/698,113

(22) PCT Filed: Mar. 7, 2012

(86) PCT No.: PCT/US2012/027931
§ 371 (c)(1),
(2), (4) Date: Nov. 15, 2012

(87) PCT Pub. No.: WO2012/122194
PCT Pub. Date: Sep. 13, 2012

(65) Prior Publication Data
US 2013/0057698 A1    Mar. 7, 2013

Related U.S. Application Data

(60) Provisional application No. 61/450,749, filed on Mar. 9, 2011.

(51) Int. Cl.
| G02B 23/12 | (2006.01) |
| G06K 9/32 | (2006.01) |
| G06K 9/62 | (2006.01) |
| F41H 3/00 | (2006.01) |
| H04N 5/33 | (2006.01) |

(52) U.S. Cl.
CPC .......... G06K 9/3241 (2013.01); G06K 9/6289 (2013.01); F41H 3/00 (2013.01); G02B 23/12 (2013.01); H04N 5/33 (2013.01)

(58) Field of Classification Search
CPC ............. G02B 23/12; F41H 3/00; H04N 5/33
See application file for complete search history.

(56) References Cited

U.S. PATENT DOCUMENTS

| 6,766,226 B2 | 7/2004 | Andersen |
| 6,801,662 B1 | 10/2004 | Owechko et al. |
| 7,065,465 B2 | 6/2006 | Chen et al. |
| 7,620,265 B1* | 11/2009 | Wolff et al. .................. 382/276 |
| 7,894,675 B2 | 2/2011 | Wiedemann et al. |
| 8,587,659 B1* | 11/2013 | Socolinsky et al. ........... 348/158 |
| 2004/0042086 A1* | 3/2004 | Beystrum et al. ............. 359/629 |
| 2006/0038713 A1* | 2/2006 | Shellans ................... F41J 2/00 342/5 |
| 2008/0158256 A1* | 7/2008 | Russell ................. G06T 7/0026 345/629 |
| 2009/0051760 A1 | 2/2009 | Ottney |
| 2010/0303294 A1 | 12/2010 | Zschau |

* cited by examiner

*Primary Examiner* — Christine Sung
(74) *Attorney, Agent, or Firm* — Daniel J. Long; Maine Cernota & Rardin; David A. Rardin

(57) ABSTRACT

A system and method for situational awareness and target cueing for use in military applications is disclosed. In extreme low light situations where the LLL sensor cannot provide SA information, the system allocates thermal information to the green SA channel to maintain the supply of contextual information to the user and thus situational awareness (SA) never drops below the native resolution of the thermal sensor. This improved SA capability, surpasses any existing LLL sensor technology in a single channel (stand-alone) application in overcast star light and below conditions.

9 Claims, 6 Drawing Sheets

SYSTEM AND METHOD FOR SITUATIONAL AWARENESS AND TARGET CUEING

CROSS-REFERENCE TO RELATED APPLICATIONS

This Application claims rights under 35 USC §119(e) from U.S. Application Ser. No. 61/450,749 filed Mar. 9, 2011, the contents of which are incorporated herein by reference.

TECHNICAL FIELD

Embodiments are generally related to night vision systems. Embodiments also relate to situational awareness and target cueing in military applications. Embodiments additionally relate to a system and method to provide situational awareness for mobility and weapon target cueing for threat detection in a range of conditions from low light to no light situations.

BACKGROUND OF THE INVENTION

Combat solders, law enforcement personnel, and others exposed to potential dangerous situation, the ready availability of information is essential in all environmental conditions. A Night Vision Device (NVD) is an optical instrument for producing images in levels of light approaching total darkness. NVD usually refers to a complete unit, including an image intensifier tube, a protective and generally water-resistant housing, and a mounting system. Many NVDs also include sacrificial lenses, IR illuminators, and telescopic lenses. Night vision systems can be hand-held, weapon mounted, or helmet mounted for easy operation.

Low-light imaging, near-infrared illumination and thermal imaging are the common methods for achieving Night Vision. The most common applications of night vision systems are situational awareness, target cueing, night driving or flying, night security and surveillance, wildlife observation, sleep lab monitoring and search and rescue.

Low-light imaging uses a device called an image intensifier to amplify available light to achieve better vision. The available light is focused through the objective lens onto a photocathode of the image intensifier. Then the electrons released by the cathode are accelerated by an electric field. The accelerated electrons enter holes in a microchannel plate and bounce off specially-coated internal walls which generate more electrons as they bounce through. This activity creates a denser "cloud" of electrons representing an intensified version of the original image. The electrons hit a phosphor screen, making the phosphor glow. The light displays the desired view to the user or to an attached camera or video device. In low light imaging, user cannot see through smoke and heavy sand storms and cannot see a person hidden under camouflage. In near-infrared illumination method, a device that is sensitive to invisible near infrared radiation is used in conjunction with an infrared illuminator. The method of near-infrared illumination has been used in a variety of night vision applications including perimeter protection.

Thermal imaging night vision methods do not require any ambient light and operate on the principal that all objects emit infrared energy as a function of their temperature. In general, the hotter an object is, the more radiation it emits. A thermal imager is a product that collects the infrared radiation from objects in the scene and creates an electronic image. Since they do not rely on reflected ambient light, thermal imagers are entirely ambient light-level independent. In addition, they also are able to penetrate obscurants such as smoke, fog and haze. The thermal images show the targets as black or white, depending upon the object temperature. Infrared thermal imaging is less attenuated by smoke and dust and a drawback is that they do not have sufficient resolution and sensitivity to provide acceptable imagery of a scene.

Digital Night Vision (DNV) systems are well known for Situational Awareness (SA) and target cueing and are widely used in military applications. Fusion systems have been developed that combine low light level imaging with thermal imaging. The low light level imaging information and thermal imaging information are fused to obtain a fused image that provides advantages of both thermal and low light imaging. In such systems low light level imaging can be utilized for SA and thermal imaging can be utilized for target cueing.

The fused DNV systems utilizes the RGB color channels to distinguish SA information in green and target cueing information in red. As shown in FIG. 1, conventional fused man-portable systems 100, directly map the thermal sensor 102 to threat detection (target cueing) 106 and the (Low light Level) LLL sensor 104 to the SA channel 108. As a result, in extremely low light "dark cave" situations, the LLL sensor 104 cannot provide SA information, as the user is blind to the surroundings. In case of situational awareness, it is found that resolution tends to deteriorate below overcast starlight. Also, in case of threat detection and target cueing, there can also be reduced threat cueing in all conditions. In such conventional fused man-portable systems, the threshold of thermal data is fixed. In dark scenarios, such as low Signal to Noise Ratio (SNR) on low light sensor, the thermal data below the threshold is disgraded and the SA is limited by low level sensor resolution.

None of the existing technologies provides situational awareness for the user in a range of conditions from low light to no light situations. Therefore, it is believed that a need exists for an improved system and method for situational awareness capability that surpasses any existing low light level sensor technology in a single channel (stand-alone) application in overcast star light and below conditions. Further such system and method should provide situational awareness that never drops below the native resolution of the thermal sensor.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for digital night vision systems.

It is another aspect of the disclosed embodiments to provide situational awareness and target cueing for use in military applications.

It is a further aspect of the present invention to provide for a system and method for use in military situational awareness and weapon target cueing in a range of conditions from low light to no light situations. The invention bridges the situational awareness performance gap at zero to low light levels. The situational awareness obtained from such system never drops below the native resolution of the thermal sensor.

It is a another aspect of the present invention to provide for an improved situational awareness capability that surpasses any existing low light level sensor technology in a single channel (stand-alone) application in overcast star light and below conditions.

It is yet another aspect of the present invention to provide for a smart fusion system in which the sensor threshold is determined by scene statistics in dark scenarios such as low SNR on low light sensor, thermal data below the threshold is supplemented to SA channel and thus SA never fails below thermal resolution.

The aforementioned aspects and other objectives and advantages can now be achieved as described herein. A system and method for situational awareness and target cueing for use in military applications is disclosed. In extreme low light situations where the LLL sensor cannot provide SA information, the system allocates thermal information to the green SA channel to maintain the supply of contextual information to the user and thus situational awareness (SA) never drops below the native resolution of the thermal sensor. This improved SA capability surpasses any existing LLL sensor technology in a single channel (stand-alone) application in overcast star light and below conditions.

The present invention utilizes metrics provided by the LLL and thermal sensors to adapt to dynamic scenes. Local Area Contrast Enhancement (LACE) having several Signal to Noise Ratio (SNR) like metrics can be utilized to determine how much to rely on LLL and the thermal sensor for the SA channel. In relatively high light conditions, almost all of the SA is mapped from the LLL sensor. As lighting conditions deteriorate, the LLL SNR decreases, the LLL sensor contribution is decreased and thermal sensor data fills the gap maintaining high SA resolution and capability.

A spatial frequency based histogram thresholding technique can be utilized to mask potential threats from background. This technique helps to reduce the number of false threats in highly cluttered scenes. In extreme low light situations where the imageries are heavily degraded, the present invention is able to provide both target cueing for threat detection and Situational Awareness (SA) for mobility.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
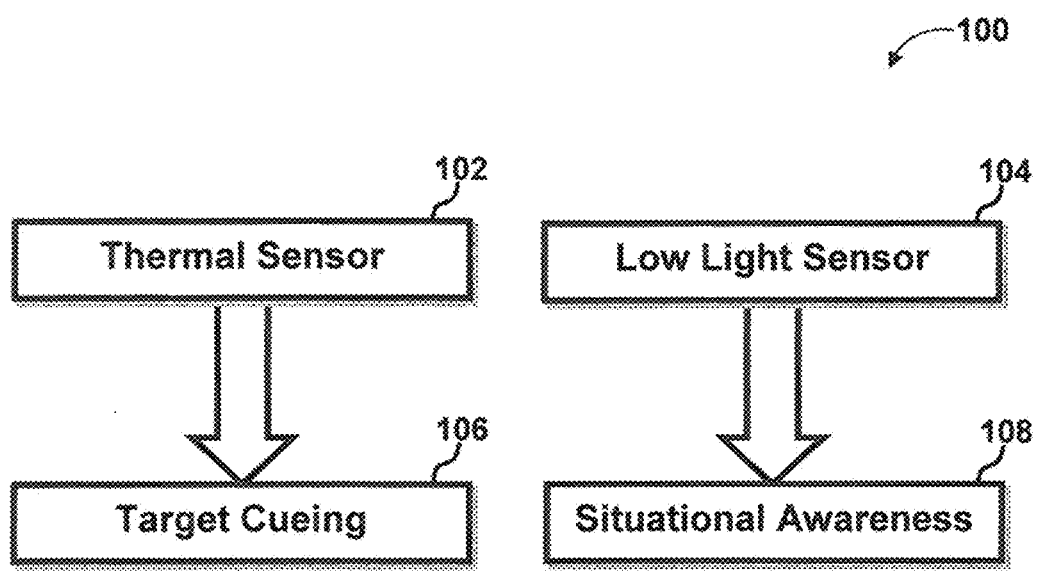
FIG. 1 illustrates a schematic diagram of conventional fused man-portable system.
Figure 2:
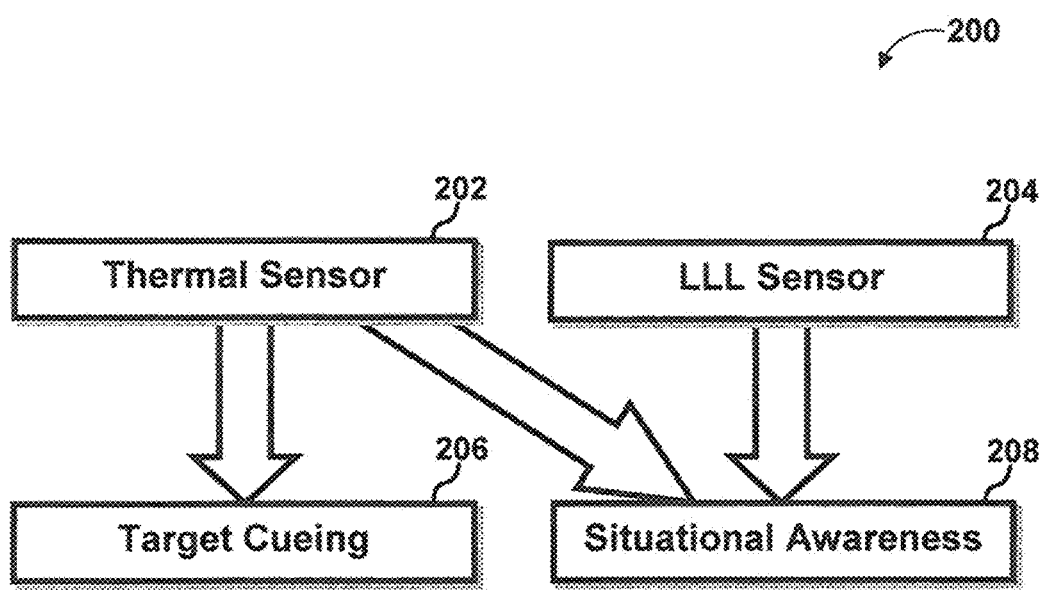
FIG. 2 illustrates a schematic diagram of smart fusion night vision system, in accordance with the disclosed embodiments.

The present invention provides both situational awareness for mobility and weapon target cueing for threat detection in a range of conditions from low light to no light situations. FIG. 2 illustrates a schematic diagram of a smart fusion night vision system 200 for situational awareness (SA) 208 and target cueing 206. The system 200 bridges the situational awareness 208 performance gap at zero to low light levels. In relatively high light conditions, almost all of the SA 208 is mapped from the Low Light Level (LLL) sensor 204 and target cueing 206 is mapped from thermal sensor 202. As the lighting conditions deteriorate, the Signal to Noise Ratio (SNR) of LLL sensor 204 decreases and hence the contribution of LLL sensor is decreased. In such situations, the system 200 allocates thermal information to the green SA channel to maintain the supply of contextual information to the user. High resolution and capability of SA 208 is maintained by filling the performance gap by utilizing the data from thermal sensor 202 for SA 208.

Figure 3:
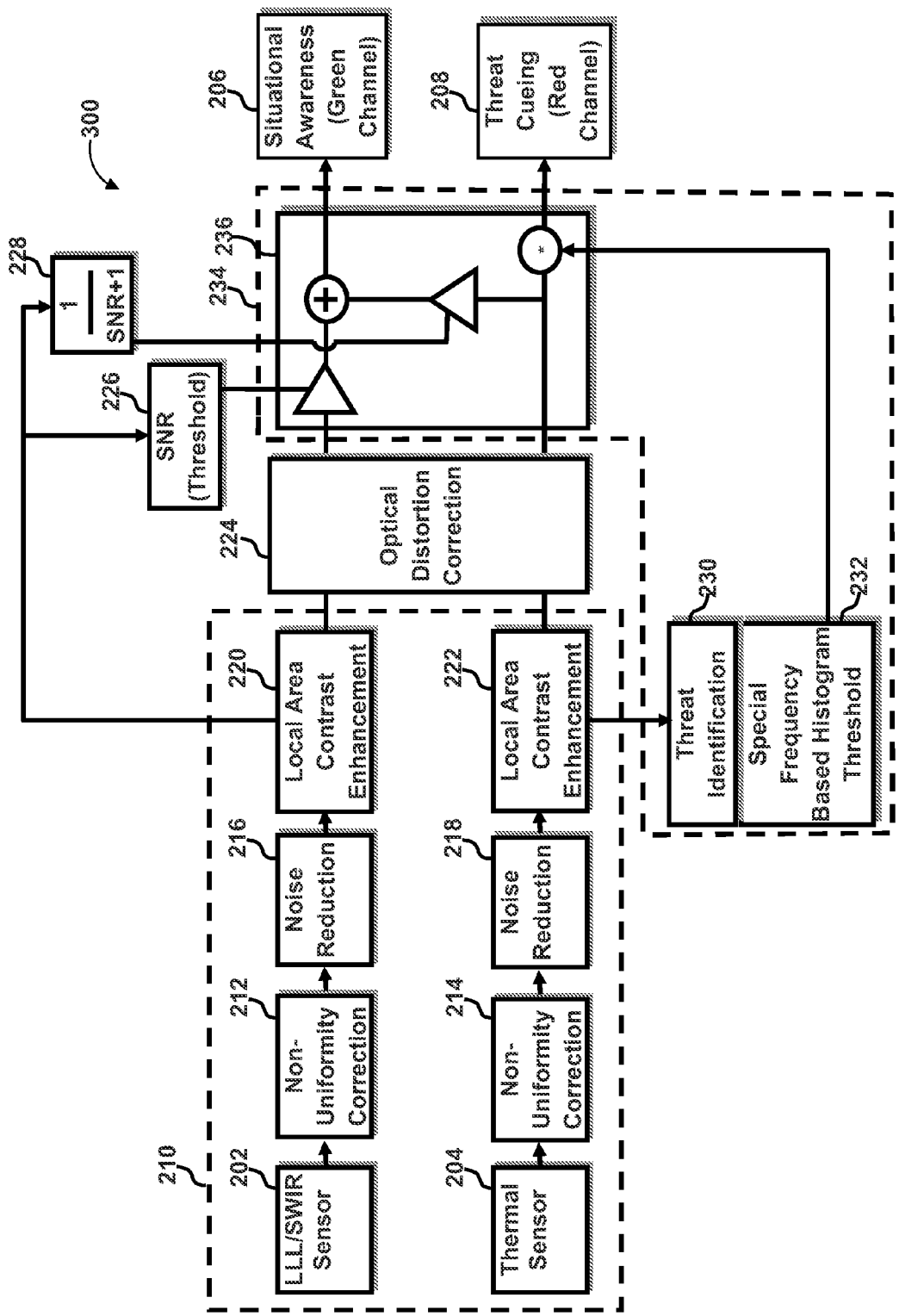
FIG. 3 illustrates a flow diagram of top-level image processing pipeline of smart fusion night vision system of FIG. 2, in accordance with the disclosed embodiments.

Referring to FIG. 3, a top-level image processing pipeline 300 for the system 200 is utilized to adapt to dynamic scenes. The perfusion and smart fusion pipelines are indicated in dashed blocks 210 and 234 respectively. The processing of SA data and target cueing data from LLL sensor 202 and thermal sensor 204 are performed in prefusion pipeline 210. As shown at block 212, 216 and 220, Non Uniformity Correction (NUC), noise reduction and Local Area Contrast Enhancement (LACE) process are carried out in SA data from LLL sensor 202. Similarly, as shown at block 214, 218 and 222, non uniformity correction, noise reduction and local area contrast enhancement process are carried out in the target cueing data from thermal sensor 204.

SA and target cueing data may contain color non-uniformities or color shift, due to input-out characteristic of a display device, electrical characteristics of constituent circuits, and optical characteristics of optical devices. The correction data for correcting color non-uniformities may be obtained by utilizing a non-uniformity correction technique. Such non-uniformity correction techniques can be calibration-based and scene-based techniques. In dim light conditions the quantum nature of light and internal electronic noise may lead to disturbing levels of noise. Noise reduction is the process of removing random unwanted perturbation from SA and target cueing data. LACE improves contrast of an imagery so as to increase the ability of the viewer to discern low contrast objects which are in different backgrounds.

As said at the block 220, the LACE process has several Signal to Noise Ratio (SNR) like metrics that are used to determine how much to rely on LLL and the thermal sensor for the SA channel. In relatively high light conditions, almost all of the SA is mapped from the LLL sensor 202. As lighting conditions deteriorate, the SNR of LLL sensor 202 decreases, the contribution of LLL sensor 202 is decreased and thermal sensor 204 data fills the gap maintaining nigh SA resolution and capability.

Optical distortion correction of the processed data is performed as said at block 224. The smart fusion device can be utilized to fuse processed data from LLL sensor 202 and thermal sensor 204. As shown at block 226 and 228, threshold SNR and 1/(1+SNR) signals are fed to the smart fusion device. Then as illustrated at block 236, smart fusion of LLL sensor data and thermal sensor data are performed such that the thermal information is allocated to the green SA channel 206 in low light levels to maintain the supply of contextual information to the user and thus situational awareness never drops below the native resolution of the thermal sensor 204.

In general, SNR is a ratio of the magnitude of the signal to the magnitude of the noise. If the noise in the scene is as bright and as large as the intensified image, the image cannot been seen. SNR changes with light level because the noise remains constant but the signal increases (higher light levels). Smart fusion is a technique in which during dark scenarios, both situational awareness and target cueing can be obtained from the thermal sensor data. Dark scenarios include no-light or extreme low-light situations such as under dense foliage, in a cave or warehouse without windows.

As depicted at block 230, the thermal sensor 204 can be utilized for primary threat detection and cueing. The spatial frequency based histogram thresholding is used to mask potential threats from background as show at block 232. This technique helps to reduce the number of false threats in highly cluttered scenes. In dark scenarios, the system effectively provides high SA resolution and capability. Under such conditions thermal sensor 204 can be utilized for both target cueing 208 and situational awareness 206.

In general thresholding is the simplest method of image segmentation. From a grayscale image, thresholding can be used to create binary images. In computer vision, segmentation refers to the process of partitioning a digital image into multiple segments (sets of pixels, also known as superpixels). The goal of segmentation is to simplify and/or change the representation of an image into something that is more meaningful and easier to analyze. Image segmentation is typically used to locate objects and boundaries (lines, curves, etc.) in images.

Figure 4:
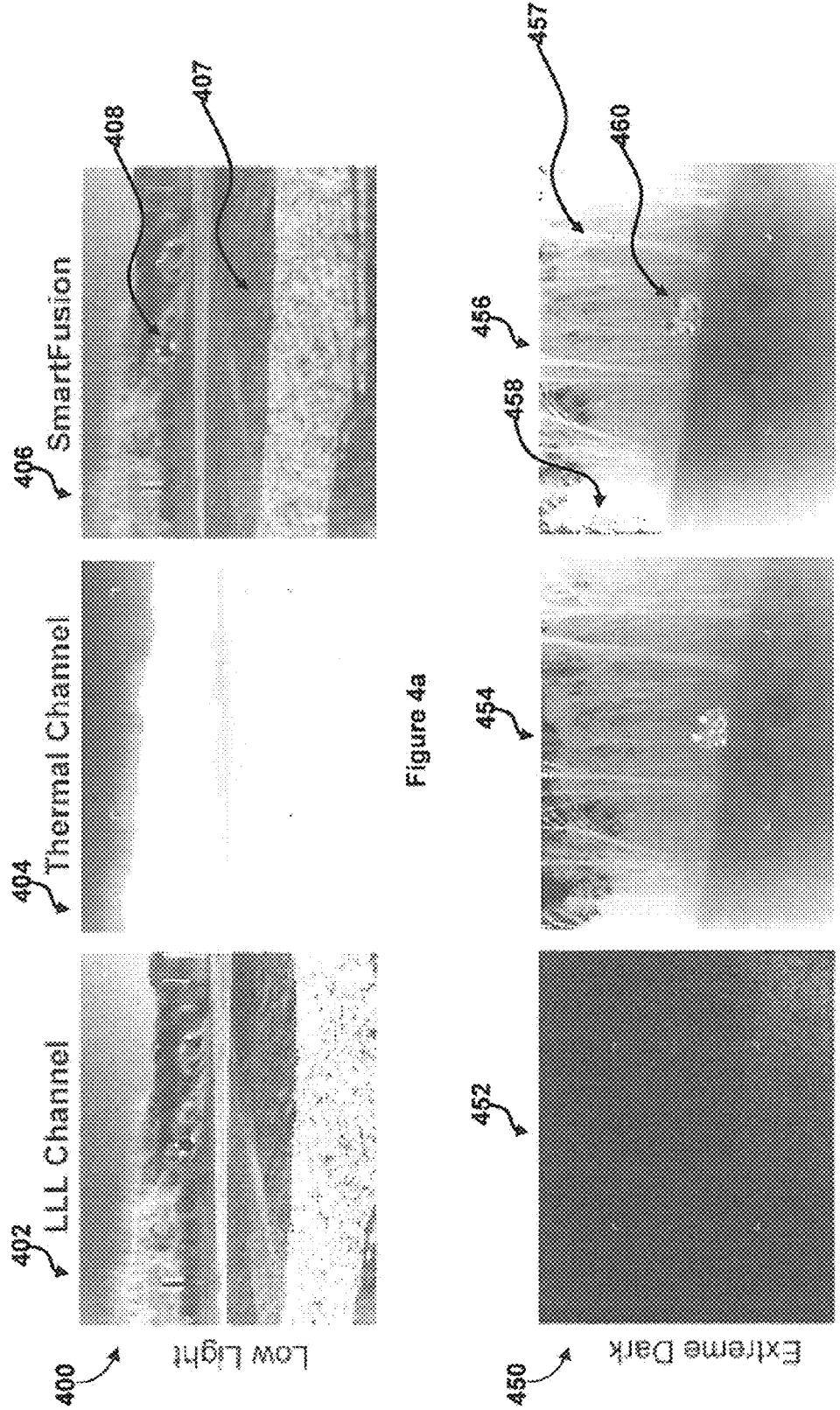
FIGS. 4a and 4b illustrate imageries obtained in low light and extreme dark situations respectively, in accordance with the disclosed embodiments.

FIGS. 4a and 4b illustrate imageries 400 and 450 obtained in low light and extreme dark situations respectively. The imageries 402 and 404 are obtained from LLL and thermal channels at low light levels. The smart fusion imagery 406 is obtained from imageries 402 and 404. The situation awareness 407 is generally indicated in green and the target cueing 408 is generally indicated in red. Similarly, the imageries 452 and 454 are obtained from LLL and thermal channels at extreme dark levels. The smart fusion imagery 456 is obtained from imagery 452 and 454. The situation awareness 457 is generally indicated in green and the target cueing 460 and 458 are generally indicated in red.

Figure 5:
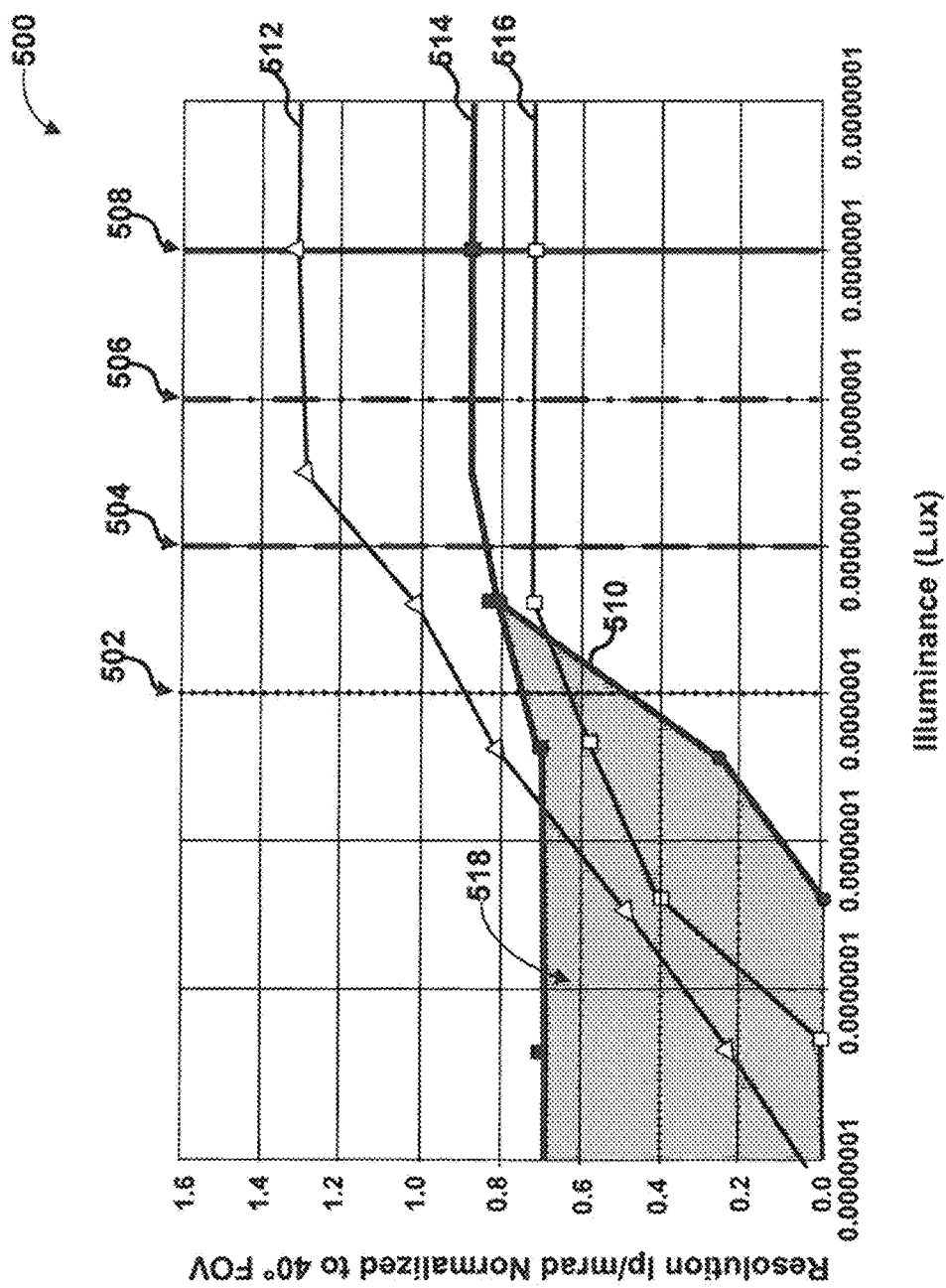
FIG. 5 illustrates a graph showing a variation of resolution with respect to illuminance, indicating SA in all light levels and flexibility in LLL sensor, in accordance with the disclosed embodiments.

FIG. 5 illustrates a graph showing a variation of resolution normalized to 40° Field Of View (FOV) and illuminance indicating SA in all light levels and flexibility in LLL sensor. The resolutions 512, 516, 514 and 518 of various NVS such as Gen 3 i2 Tube, ISIE-11, Smart Fusion with Radiance and Radiance respectively over the varying light conditions 502, 504, 506 and 508 such as overcast starlight, starlight, one fourth moon and full moon respectively are shown FIG. 5. The improved SA of Smart Fusion system is indicated in shaded area 518. As shown, the resolution of smart fusion remains higher and constant for low to dark light levels when compared to other NVSs. Note that the resolution of night vision systems such as Gen 3 i2 Tube, ISIE-11 and Radiance are compared with the present invention as a result, the thermal sensor data of present invention fills performance gap at zero to low light level and maintains high SA resolution and capability.

Figure 6:
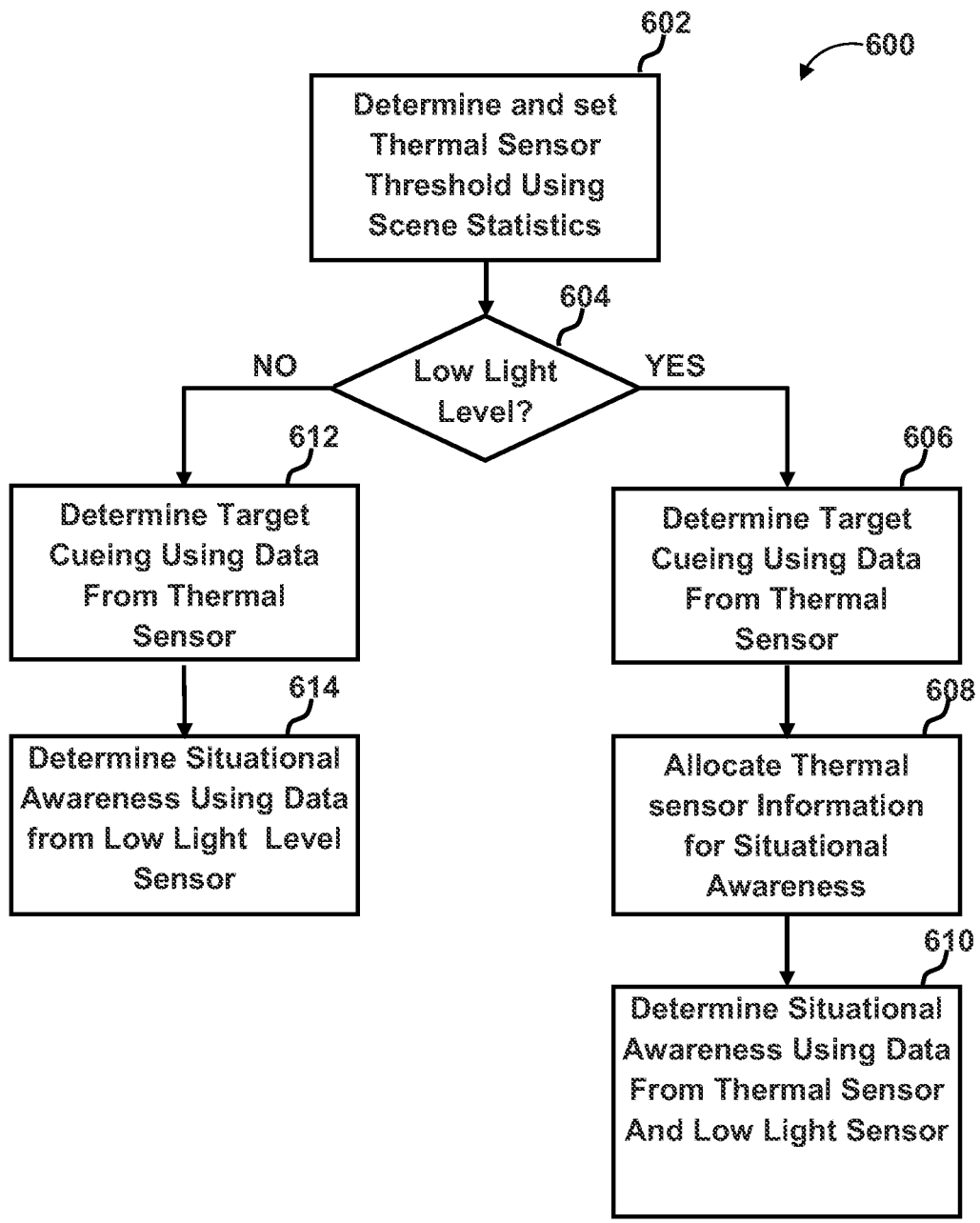
FIG. 6 illustrates a flow chart showing the process involved in SA and target cueing such that SA never drops below the native resolution of the thermal sensor, in accordance with the disclosed embodiments.

FIG. 6 illustrates a flow chart 600 showing the process involved in SA and target cueing such that SA never drops below the native resolution of the thermal sensor. In smart fusion system 200 depicted in FIG. 2, the threshold of thermal sensor is determined and set using scene statistics as illustrated at block 602. Then as shown at block 604, the surrounding light level is checked. Under the situations other than dark scenarios, as said at the block 612 and 614, the SA information is mapped from LLL sensor and target cueing information is mapped from thermal sensor. In dark scenarios, the target cueing is determined using data from thermal sensor as illustrated at block 606. As the contribution of LLL sensor for SA is decreased in dark scenarios, the thermal sensor information is allocated for situation awareness as illustrated at block 608. Then, as said at block 610, the target cueing can be determined by using data from thermal sensor and low light sensor.

Note that the invention uses lookup tables such as Rlut and fscale for obtaining an imagery which utilizes the RGB color channels to distinguish SA information in green and Target Cueing information in red. The RLut is a lookup table that allows the translation of a red pixel value based on Concept of Operations (CONOPS) related functions. A lookup table generated based on RLut[x]=x will result in no change to the output pixel. A lookup table based on RLut[0-127]=0.5x and RLut[128-255]=2x will result in amplification of infrared data on warm targets. This tends to highlight human bodies and other points of interest. The fscale controls the blending of infrared and low light imagery in the green channel. The index selected is based on the frame average of the low light sensor. A higher value results in more LLL data in the pixel. The resulting pixel will be a blend of (fscale[x]/255)*IR+ ((255−fscale[x])/255)*LLL. A typical function for this lookup table will be flat at 255 for higher values with a steep fade to 0 at lower values. This results in a green pixel that consists mainly of LLL data until the data in that frame decreases significantly, at which point the IR data will blend in.

Thermal imaging system combined with low light level imaging technologies allows the use of DNV system in nighttime low-light and adverse weather conditions observation. The combination of the channels allows the user to take full advantage of both technologies by creating a fused image for enhanced night vision observation. The fused image allows the benefits and capabilities of both technologies and detect both the image low light level imaging scene and the thermal imaging scene. This will not miss anything that would have been unable to see by either technology separately. Also, the system effectively provides both situational awareness for mobility and weapon target cueing for threat detection in a range of conditions from low light to no light situations.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for providing imagery for situational awareness and target cueing comprising:
    determining a threshold of a thermal sensor using a scene statistics;
    establishing a dark light level of a surrounding;
    mapping information from said thermal sensor for target cueing;
    allocating information from said thermal sensor for situational awareness;
    mapping information from a low light level sensor and said allocated information from said thermal sensor for situational awareness; and fusing information from said low light level sensor and said thermal sensor to obtain said imagery in which situational awareness (SA) never drops below a native resolution of said thermal sensor.

2. The method of claim 1 wherein said imagery is conducted at low light levels.

3. The method of claim 2 wherein reliability of said low light level sensor and said thermal sensor for the SA are determined by utilizing signal to noise ratio metrics.

4. The method of claim 1 wherein spatial frequency based histogram thresholding is used to mask potential threats from a background.

5. The method of claim 1 further comprising processing information from said thermal and low light sensor before fusing information.

6. The method of claim 1 wherein processing information comprises non uniformity correction, noise reduction and local area contrast enhancement.

7. The method of claim 1 wherein said thermal sensor is utilized to obtain target cueing information at both low and high light conditions.

8. The method of claim 1 wherein information from said low light level sensor is utilized to obtain situational awareness information at high light condition.

9. The method of claim 1 wherein information from said low light level sensor and said thermal sensor are utilized to obtain situational awareness information at low light condition.

* * * * *